US007097512B1

(12) United States Patent
Hsiao et al.

(10) Patent No.: US 7,097,512 B1
(45) Date of Patent: Aug. 29, 2006

(54) MINI MEMORY CARD ADAPTER

(75) Inventors: Kun-Hsien Hsiao, Chung Ho (TW);
Yen-Jung Feng, Chung Ho (TW);
Mei-Hua Hsu, Chung Ho (TW);
Chun-Chung Chen, Chung Ho (TW)

(73) Assignee: Chip Hope Co., Ltd., (TW)

( * ) Notice: Subject to any disclaimer, the term of this patent is extended or adjusted under 35 U.S.C. 154(b) by 0 days.

(21) Appl. No.: 11/267,132

(22) Filed: Nov. 7, 2005

(51) Int. Cl.
*H01R 24/00* (2006.01)

(52) U.S. Cl. ...................................... 439/630
(58) Field of Classification Search ................ 439/630, 439/737, 95, 92, 638, 628
See application file for complete search history.

(56) References Cited

U.S. PATENT DOCUMENTS

| 6,132,223 | A * | 10/2000 | Seeley et al. ............... 439/76.1 |
| 6,213,790 | B1 * | 4/2001 | Kakinoki et al. ............. 439/95 |
| 6,272,017 | B1 * | 8/2001 | Klatt et al. .................. 361/737 |
| 6,561,851 | B1 * | 5/2003 | Florescu ..................... 439/630 |
| 6,746,280 | B1 * | 6/2004 | Lu et al. ..................... 439/630 |
| 6,773,280 | B1 * | 8/2004 | Sasaki et al. ............... 439/159 |
| 6,915,956 | B1 * | 7/2005 | Liu et al. .................... 235/492 |
| 6,929,513 | B1 * | 8/2005 | Fan ............................ 439/630 |
| 6,932,623 | B1 * | 8/2005 | Lai ........................... 439/76.1 |
| 7,025,637 | B1 * | 4/2006 | Lee ............................ 439/638 |
| 2004/0113249 | A1 * | 6/2004 | Ito et al. ..................... 257/679 |
| 2006/0014434 | A1 * | 1/2006 | Yamamoto et al. ......... 439/630 |

* cited by examiner

*Primary Examiner*—Tulsidas C. Patel
*Assistant Examiner*—Harshad Patel
(74) *Attorney, Agent, or Firm*—Hershkovitz & Associates; Abe Hershkovitz

(57) ABSTRACT

A mini memory card adapter that receives a mini memory card (e.g. MicroFlash) to make it compatible with a standard memory card interface. The mini memory card adapter is comprised of a base, a cover and a connection module. A socket is defined at a proximal end of the base, and an inner wall of the socket has a positioning tab integrally formed thereon to fix an inserted memory card. A metal panel has a contact finger that electrically contacts a ground point to provide protection against EMI interference.

7 Claims, 8 Drawing Sheets

MINI MEMORY CARD ADAPTER

BACKGROUND OF THE INVENTION

1. Field of the Invention

The present invention relates to a memory card adapter, and particularly relates to a mini memory card adapter, by which a mini memory card (e.g. Microflash) can be read by a standard memory card (e.g. SD memory card) interface.

2. Description of the Related Art

Various digital electronic devices are coming into the market nowadays, such as digital players, digital cameras, and multi-functional cellular phones. Those electronic devices always multi-functional and require storage media with large capacities. Memory cards of different sizes and specifications have been developed, such as SM (smart media card), MMC (multi-media card), SD (secure digital memory card), XD (xD-piture card), and MS (memory stick). However, there are still challenges to be faced in regards to size reduction with the development of even smaller digital electronic devices. And Mini SD, RS-MMC (reduced size multi-media card) even MicroFlash have been developed for smaller product applications.

However, a memory card that is smaller than the standard is not compatible with a device with a standard interface. So an adapter must be applied to correlate the memory card and the standard interface.

With reference to FIG. 7 and FIG. 8, a mini SD card adapter has a base (80) with two side walls, a positioning tab (86), a circuit board (87) provided in a distal end of the base (80), a cover (88) made of metal lamina and a second cover (89).

The base (80) and the cover (88) define a socket (81) in a proximal end to receive a mini SD card. Multiple through slots (82) are arranged at equal distance in the distal end of the base (80). The base (80) has two stops (83) formed on outer surface of each wall. In one of the walls, a mounting slot (84) is defined therein which partly communicates with the socket (81). Two tab slots (85) are respectively defined in a top end of each wall.

The positioning tab (86) is provided in the mounting slot (84) with a protruding member (860) formed in a middle part of the positioning tab (86). A mini SD card received in the socket (81) can be positioned by the protruding member (860).

The circuit board (87) at the distal end of the base (80) has a plurality of contacts (not numbered) at a bottom face corresponding to the through slots (82); at the proximal end of the circuit board (87), multiple pins (870) extend into the socket (81) to electrically contact the mini SD card.

The cover (88) has two folded edges (880) on opposite sides, each with two slots (881) that correspond with the stops (83) on the walls of the base (80). Two tabs (882) are formed on two sides at the proximal end of the cover (88), respectively. The tabs (882) tilt inward have a slightly greater width than the tab slots (85). When the cover (88) is fitted onto the base (80), the four stops (83) are inserted to the four slots (881) and the two tabs (882) are inserted to the tab slots (85) to secure the cover (88) to the base (80).

The board (89) is mounted at the distal end of the base (80) above the cover (88).

A mini SD card adapter is formed with above elements to receive a mini SD card. The adapter can then be inserted into a standard SD interface, thus allowing the mini SD card to be used in a device with a standard SD interface.

However, the positioning tab (86) for locating the mini SD card is an additional element that also requires a mounting slot (84) to be defined on the base, necessitating additional molding, which results in increasing the manufacturing costs.

With reference to FIG. 9, another conventional mini SD card adapter is shown having a positioning tab, which has the same function as that of the conventional mini SD card adapter described above.

Therefore, the present invention provides a mini memory card adapter to mitigate or obviate the aforementioned problems.

SUMMARY OF THE INVENTION

The main objective of the present invention is to provide a mini memory card adapter comprising a base, a connection module, a cover and a metal panel.

The base has a socket defined in a proximal end, and a positioning tab is integrally formed in an inner wall of the socket to fix the inserted mini memory card, which has the same function as the prior art, but omits the mounting slot, and the step of mounting the positioning tab, so the adapter of this invention simplifies the manufacturing process, enhances the effectiveness and reduces the cost.

A contact finger extends from an edge of the metal panel and curves to touch the bottom of the metal panel corresponding to an opening (23) in the cover. The contact finger is connected to the ground point through the opening to be electrically connected to ground. The metal panel then provides protection from EMI interference that is more efficient when compared to that of a conventional adapter.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
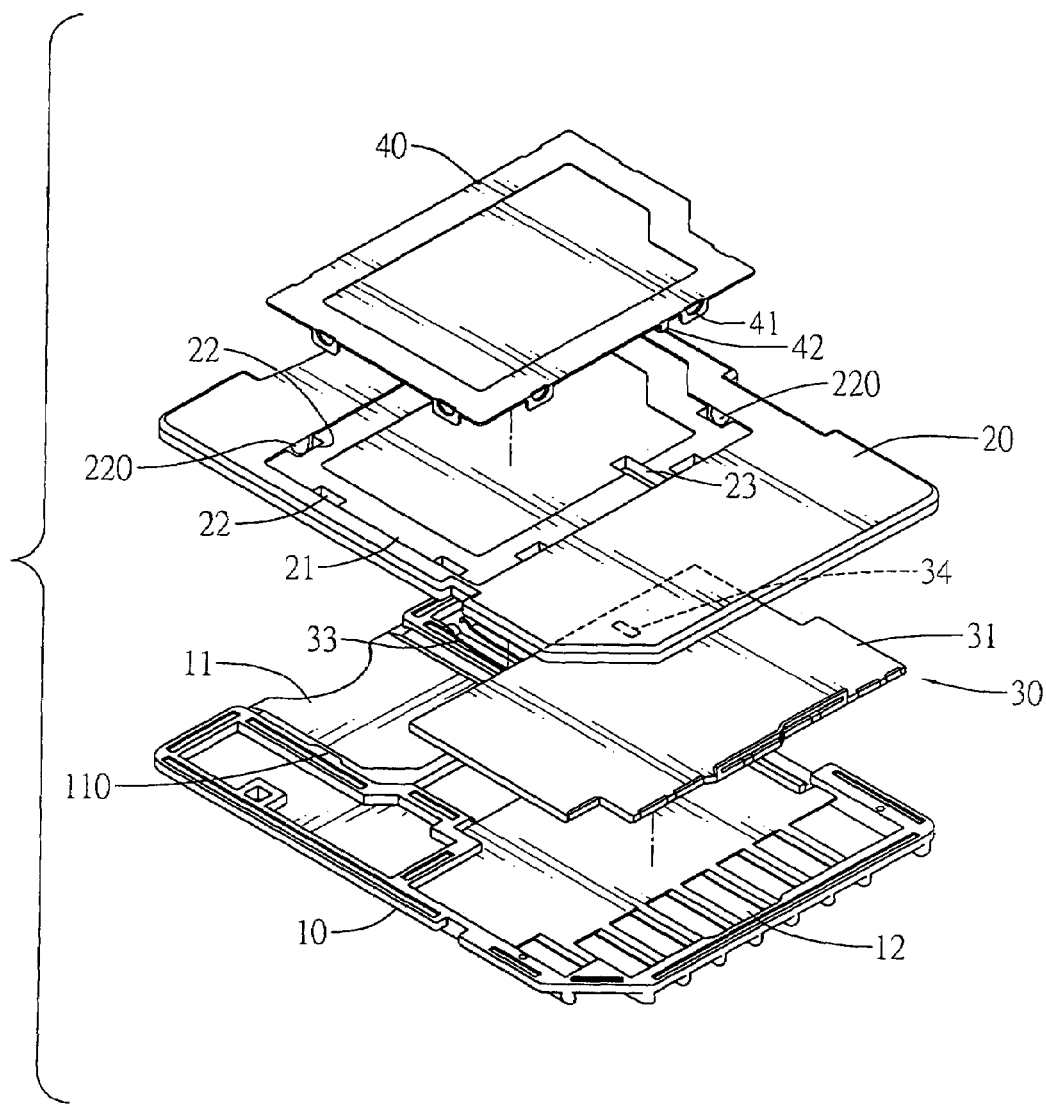
FIG. 1 is an exploded perspective view of a mini SD card adapter in accordance with this invention.
Figure 2:
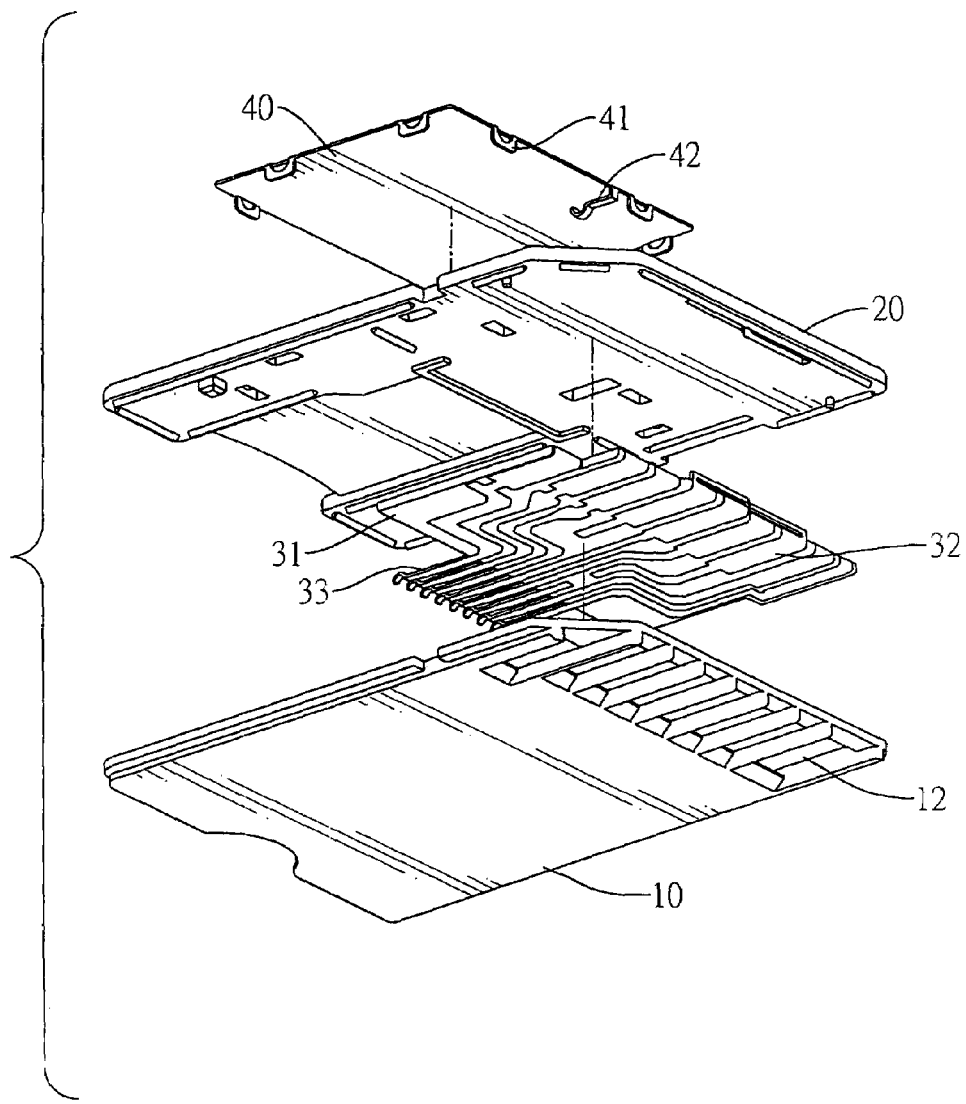
FIG. 2 is an exploded lower perspective view of the mini SD card adapter in accordance with this invention.
Figure 3:
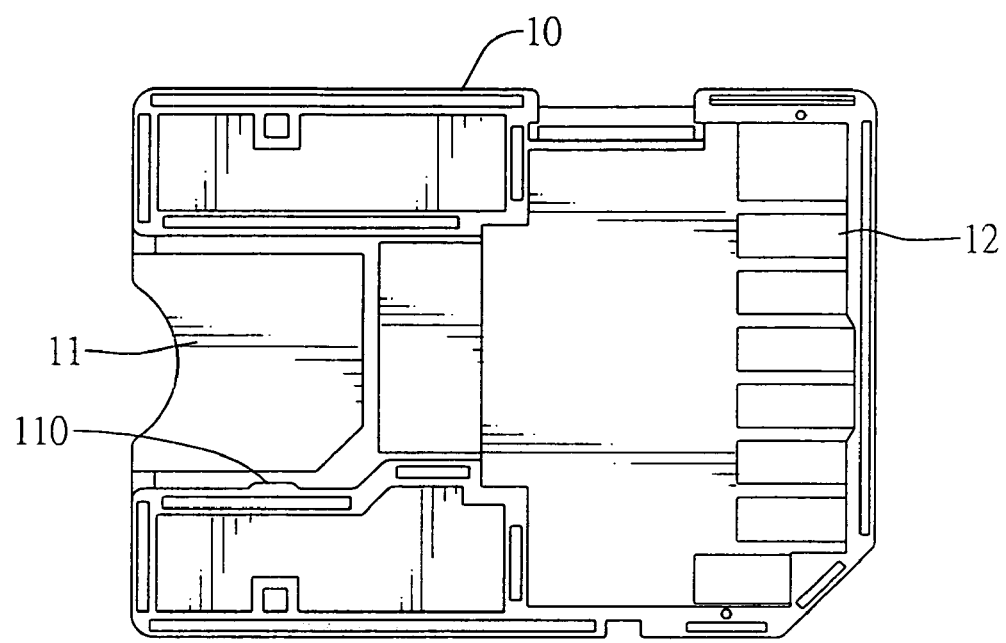
FIG. 3 is a plan view of the base of the mini SD card adapter in accordance with this invention.

With reference to FIGS. 1–3, a mini memory card adapter is composed of a base (10), a cover (20), a connection module (30) provided between the base (10) and the cover (20); and a metal panel (40).

The base (10) has a socket (11) defined in a proximal end to receive the mini memory card, and an inner wall of the socket (11) has a positioning tab (110) integrally formed thereon, which trapezoidal in shape and protrudes from the inner wall in this embodiment, in order to fix the inserted mini memory card. Multiple through slots (12) are defined at a distal end of the base (10).

The connection module (30) includes a printed circuit board (31) with multiple contacts (32) provided at a distal end, corresponding to the through slots (12) of the base (10), whereby the adapter is electrically connected with external devices. Multiple contact pins (33) are provided at a proximal end of the printed circuit board (31), the distal ends of the contact pins (33) are connected to the contacts (32), and the proximal ends are secured in the socket (11) to electrically connect with the memory card. A ground point (34) is provided on a top surface of the printed circuit board (31) and connected to one of the contacts (32).

The cover (20) is mounted on the base (10) to form an appearance of a standard SD memory card in this embodiment. A top surface of the cover (20) has a recess (21) defined thereon, and multiple notches (22) are defined at the edges of the recess (21), in addition, every notch (22) has a lug (220) formed at one of inner walls. In this embodiment, each lug (220) is semicircular in shape and has a thinner top portion and a thicker bottom portion to form an inclined surface. In addition, an opening (23) is defined in the recess (21) through the cover (20).

The shape of the metal panel (40) corresponds to the recess (21) and multiple tabs (41), each having a semicircular opening corresponding to the lugs (220), extend down from the edges of the metal panel (40). In addition, a contact finger (42) extends from an edge of the metal panel (40) and curves to a bottom of the metal panel (40) corresponding to the opening (23) in the cover (20).

Figure 4:
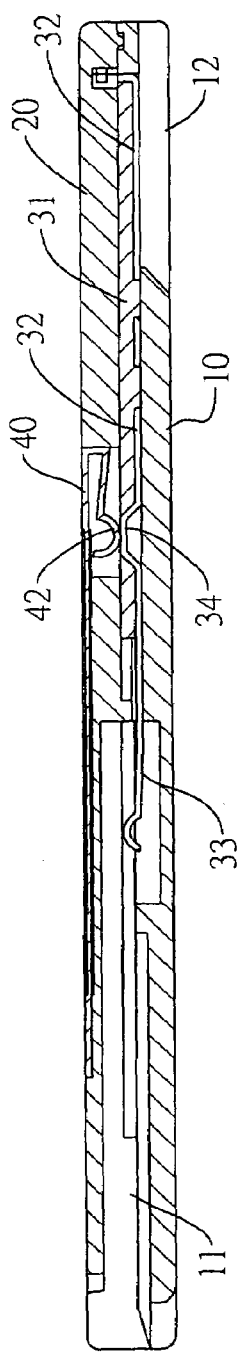
FIG. 4 is a sectional view of the mini SD card adapter in accordance with this invention.
Figure 5:
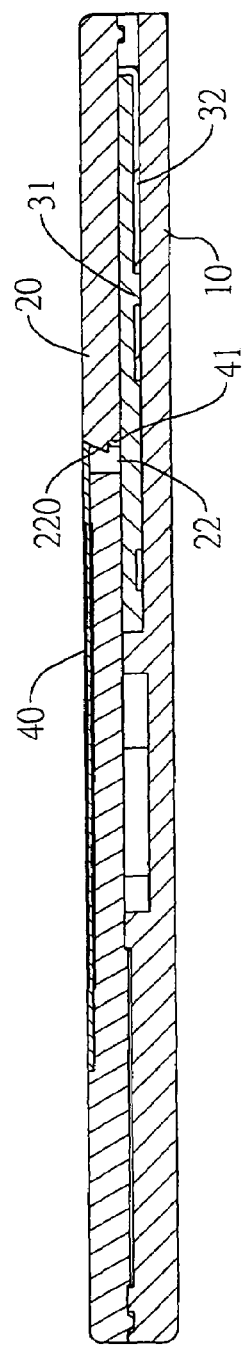
FIG. 5 is another sectional view of the mini SD card adapter in accordance with this invention.
Figure 6:
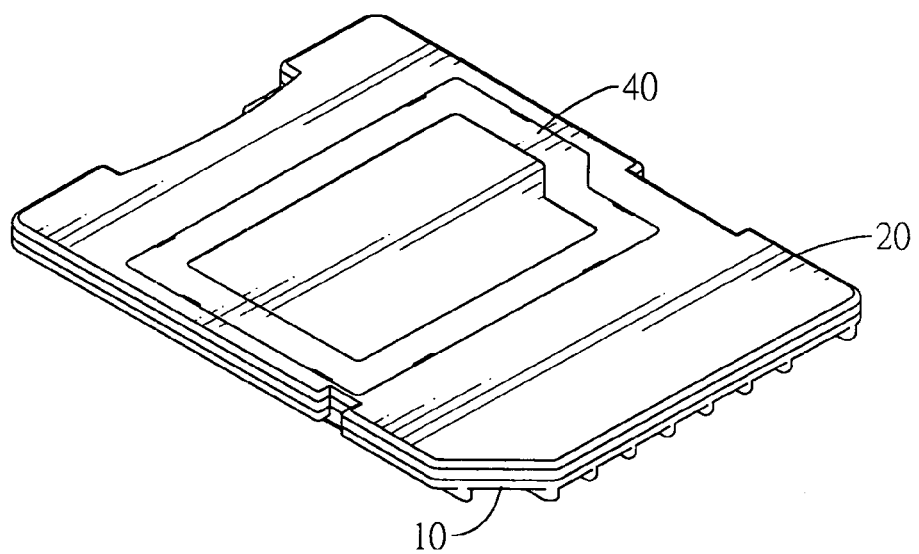
FIG. 6 is a perspective view of the mini SD card adapter in accordance with this invention.
Figure 7:
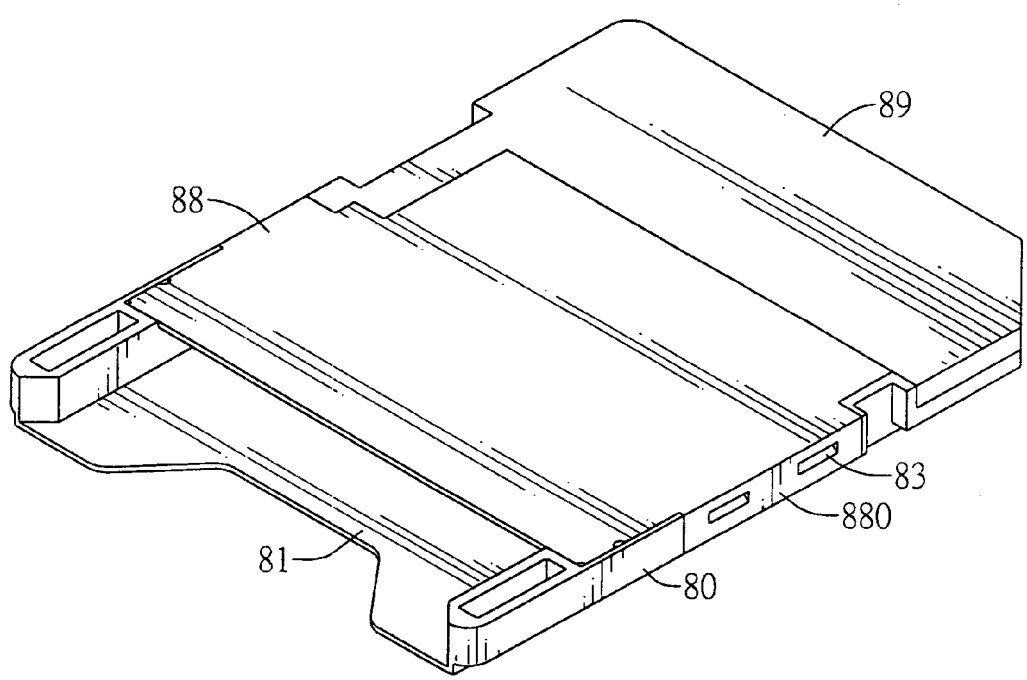
FIG. 7 is a perspective view of a conventional mini SD card adapter in accordance with the prior art.
Figure 8:
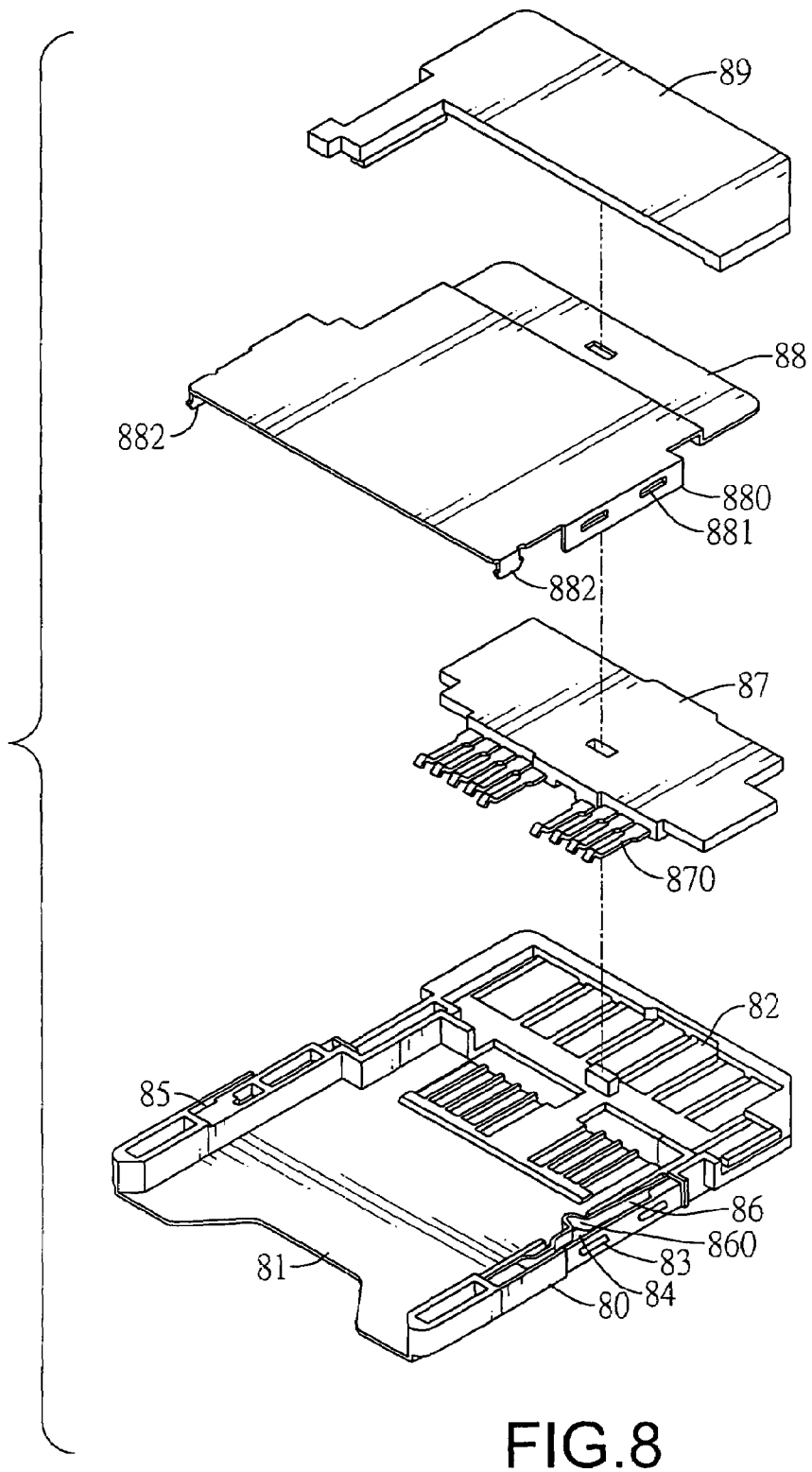
FIG. 8 is an exploded perspective view of the conventional mini SD card adapter in accordance with the prior art.
Figure 9:
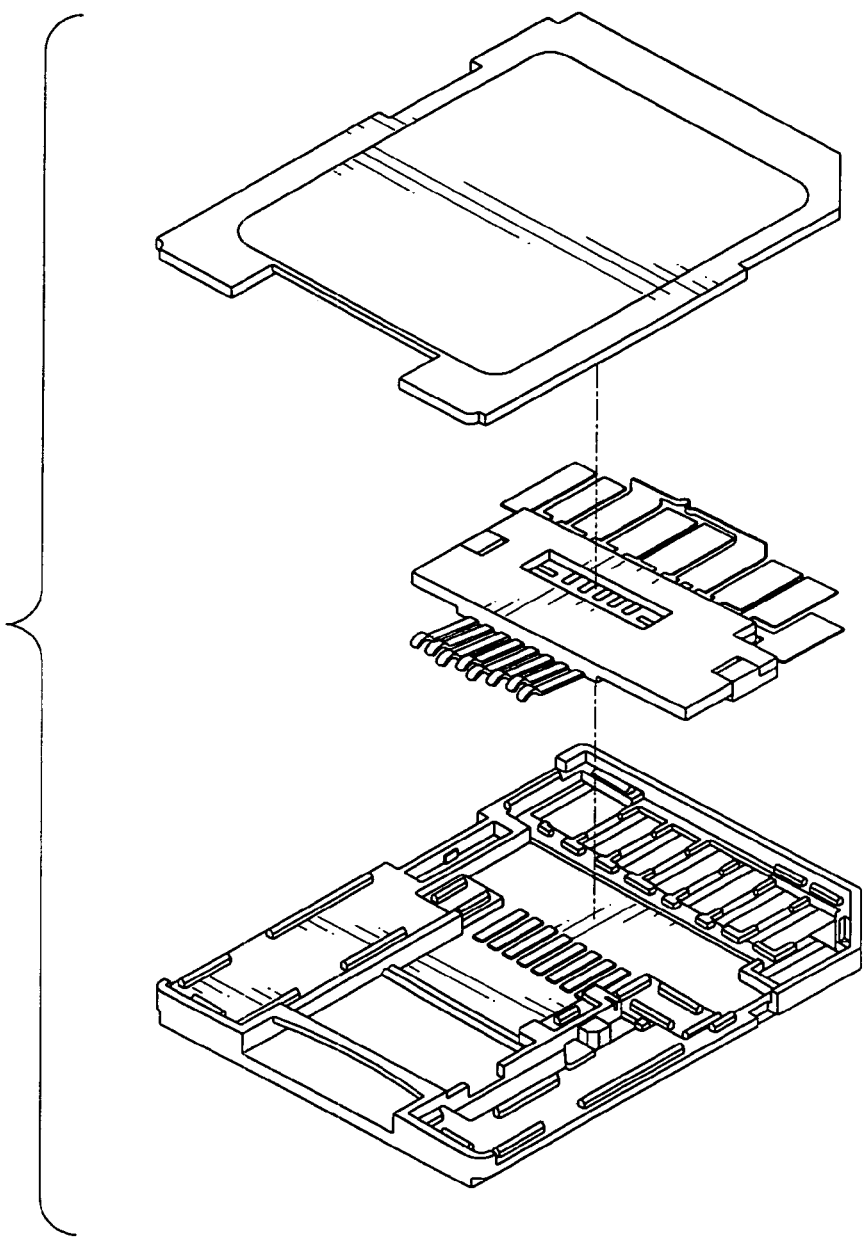
FIG. 9 is an exploded perspective view of another conventional mini SD card adapter in accordance with the prior art.

When the base (10), connection module (30) and the cover (20) are mounted together, the contacts (32) are secured in the corresponding through slots (12) to be electrically connected to the eternal devices, and the proximal ends of the contact pins (33) are secured in the socket (11) to electrically connected with the memory card. The metal panel (40) is secured in the recess (21), and the contact finger (42) is connected with the ground point (34) through the opening (23), as shown in FIG. 4. The tabs (41) extending from the metal panel (40) are fastened respectively to the lugs (220), as shown in FIG. 5, whereby the metal board (40) is fixed at the recess (21). A mini memory card adapter is assembled as shown in FIG. 6.

The advantages of the invention are:

1. The positioning tab is integrally formed on an inner wall of the socket to fix the inserted mini memory card, which has the same function as the prior art, but omits the mounting slot, and the step of mounting the positioning tab, so the adapter of this invention simplifies the manufacturing process, enhances the effectiveness and reduces the cost.

2. The metal panel connected with the ground point through the opening by the contact finger provides protection from EMI interference, that is more efficient when compared to that of a conventional adapter.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A mini memory card adapter comprising:
    a base having
        a socket defined in a proximal end of the base to receive a mini memory card,
        a positioning tab integrally formed on an inner wall of the socket, and
        multiple through slots arranged at equal distance and defined in a distal end of the base;
    a connection module comprising
        a printed circuit board with
            multiple contacts formed at a distal end of the printed circuit board to correspond to the through slots of the base,
            multiple contact pins formed at a proximal end of the printed circuit board, wherein distal ends of the contact pins are connected to the multiple contacts, and proximal ends of the contact pins are to be secured in the socket to electrically connect to the memory card, and
            a ground point formed at a top surface of the printed circuit board and connected with one of the contacts;
    a cover having
        a recess defined thereon, and
        an opening defined in the recess through the cover; and
    a metal panel secured in the recess with a contact finger extending from an edge of the metal panel to connect to the ground point through the opening of the cover.

2. The mini memory card adapter as claimed in claim 1, wherein the positioning tab is in the shape of a trapezoid.

3. The mini memory card adapter as claimed in claim 1, wherein
    multiple notches are defined at edges of the recess of the cover, and each notch has a lug formed at an inner wall defining the notch, and
    multiple tabs corresponding to the lugs extend from the metal panel and are respectively fastened to the lugs.

4. The mini memory card adapter as claimed in claim 3, wherein each lug is semicircular in shape and are wider at the top, and the multiple tabs have a semicircular opening that corresponds to the lugs.

5. The mini memory card adapter as claimed in claim 1, wherein the contact finger is curved to touch a bottom of the metal panel.

6. The mini memory card adapter as claimed in claim 3, wherein the contact finger is curved to touch a bottom of the metal panel.

7. The mini memory card adapter as claimed in claim 4, wherein the contact finger is curved to touch a bottom of the metal panel.

* * * * *